United States Patent [19]

Ferris et al.

[11] 4,105,365

[45] Aug. 8, 1978

[54] HELICOPTER ROTOR LEAD-LAG DAMPER

[75] Inventors: Donald Leroy Ferris, Newtown; George Arthur Smith, Trumbull, both of Conn.

[73] Assignee: United Technologies Corporation, Hartford, Conn.

[21] Appl. No.: 729,340

[22] Filed: Oct. 4, 1976

[51] Int. Cl.² ............................................. B64C 27/42
[52] U.S. Cl. ..................................... 416/107; 416/140
[58] Field of Search ................... 416/106, 107, 140 A, 416/134 A, 143; 188/1, 88

[56] References Cited

U.S. PATENT DOCUMENTS

| | | | |
|---|---|---|---|
| 2,698,675 | 1/1955 | Rossman | 416/140 X |
| 2,774,553 | 12/1956 | Jensen | 416/140 X |
| 3,484,173 | 12/1969 | Rybicki | 416/107 X |
| 3,923,419 | 12/1975 | Mouille | 416/107 |

FOREIGN PATENT DOCUMENTS 132,398  10/1946  Australia .................... 416/106

*Primary Examiner*—Everette A. Powell, Jr.
*Attorney, Agent, or Firm*—Vernon F. Hauschild

[57] ABSTRACT

A helicopter rotor lead-lag hydraulic fluid damper has an internal anti-torque shaft preventing rotary motion of the dynamic fluid retaining seal. An independent fluid reservoir under centrifugal force supplies lubrication to the low pressure side of the seal. At rest, the fluid returns to the lower reservoir chamber by gravity.

7 Claims, 5 Drawing Figures

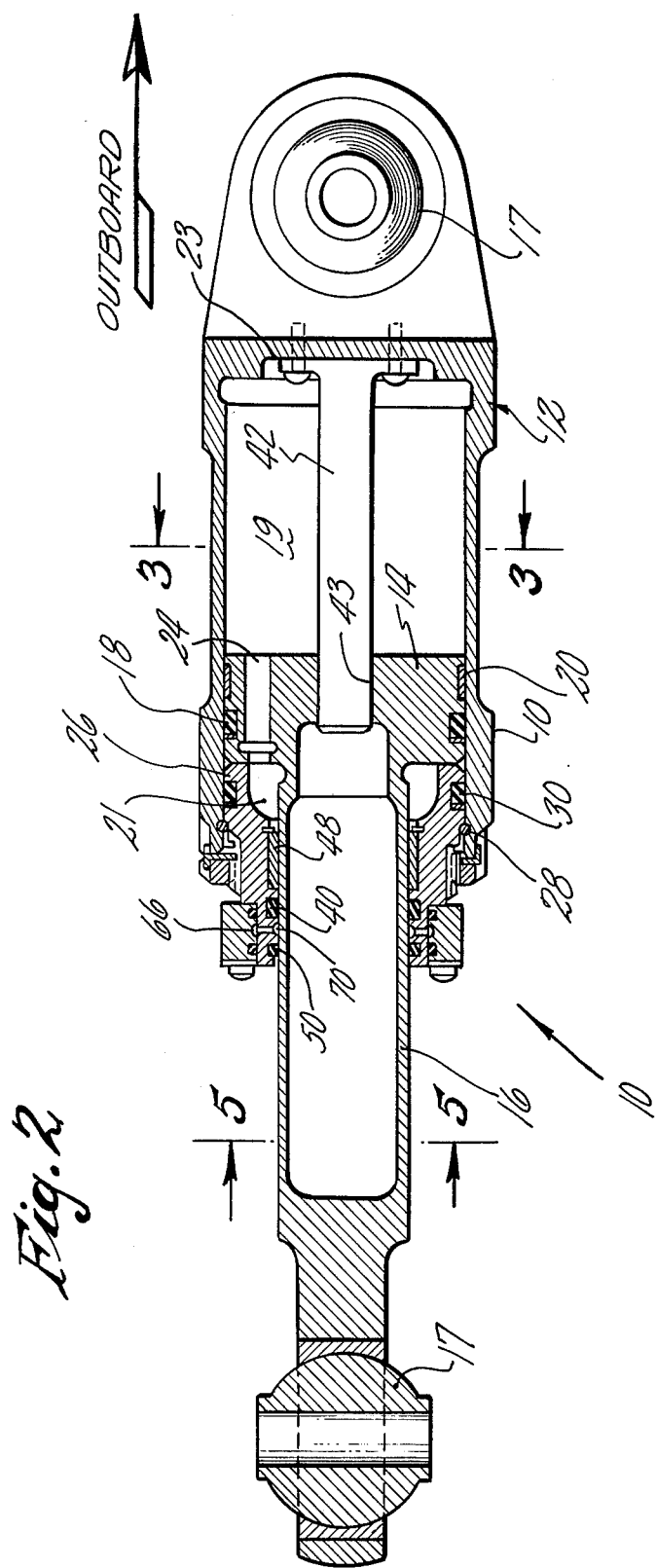

HELICOPTER ROTOR LEAD-LAG DAMPER

CROSS-REFERENCES TO RELATED APPLICATIONS

Patent applications of the assignee relating to the lubrication of dynamic damper seals were filed concurrently June 5, 1975 and are entitled "Leakage Detector with a Back Pressure Sensor" and "Redundant Damper Seals" and identified as Ser. No. 584,237 now U.S. Pat. No. 3,972,396 dated Aug. 3, 1976 and 584,238, respectively. Each application depicts dual rod/housing seals with a fluid collection annulus therebetween in communication with an indicator to provide notice of seal failure. Both configurations suffer from the envelope and weight penalties of the redundant seal, and in neither instance is there fluid supplied by centrifugal force to the low pressure side of the outer seal.

BACKGROUND OF THE INVENTION

1. Field of Invention

This invention relates to helicoptor rotor lead-lag dampers and more particularly to such dampers which are hydraulic devices of the piston and cylinder configuration which incorporate an external seal between their relatively moving parts so as to retain the fluid. This invention is addressed to improving the life of the seal by increasing its capability to resist wear. More particularly the invention relates to means for reducing the adverse effects of scuffing, bunching, or scraping, which is induced either axially or torsionally by a lack of anti-friction lubricant during motion of the device. Means are provided by this invention to both limit the torsion motion of the seal and also to provide a supplemental source of fluid to the external side of the seal.

2. Description of the Prior Art

Rotation prevention means have been used on hydraulic operating apparatus having telescopic shafts, wherein the object of the means is to preserve orientation of the shaft members. An example of such means is a telephone lineman's or fire truck extensible boom having a platform or bucket on its outer end. U.S. Pat. No. 2,666,417 to Harsch shows such apparatus having an internal non-circular guide preventing relative rotational motion of the telescopic shafts. There is no indication or suggestion in this prior art that the use of such a guide could provide an advantage to a seal. The motions and function of the boom apparatus are infrequent and not of an oscillatory or reciprocal nature. The stroke is long and slow, averaging only a few cycles per day, while in the damper field of this invention the strokes of a piston may average over 300 cycles per minute, with replacement times desired to be in excess of several thousand hours.

The effects of heat generated by this action, altitude of the aircraft involved, the influence of centrifugal force, material and weight restrictions all impose constraints on seal design not found in the environment of the Harsch patent.

Likewise, U.S. Pat. No. 2,244,150 to Greve illustrates the use of a guide between cooperating cylinders of a shock absorbing landing gear strut for the similar purpose of maintaining proper orientation of a wheel. This is also not an environment wherein extensive concern need be expressed for overworking of the dynamic seal.

The prior art includes various systems for the supplying of internal replacement hydraulic fluid to components, including helicopter dampers such as shown in U.S. Pat. No. 2,604,953 to Campbell and to propeller hub bearings as shown in Pat. No. 2,160,745 to Levy. It is also known that damper seals may occasionally be designed so as to leak slightly in order to provide operation on a wetted surface for wear reduction purposes. The feature not apparent from this prior art, in addition to the teaching of the benefits of non-rotation, is the supplying of fluid to the outside or low pressure side of the dynamic seal so as to provide it with a wetted surface on which to operate without intentionally producing leakage. The prior art also includes U.S. Pat. No. 2,334,115 to Meredith, which teaches a dashpot configured to collect fluid leaking past the dynamic seal and return it to the inner pressure chambers. There is no teaching in this reference of the use of centrifugal force, nor is there an anti-rotation means included.

SUMMARY OF THE INVENTION

It is an object of this invention to provide an improvement to the operating environment of dynamic seals in such lead-lag dampers by decreasing the tendency of the seals to bind or scrape axially or rotationally over a dry surface.

More particularly, it is an object of this invention to completely prevent such dynamic seals from torsional or rotational movement per se, while providing externally supplied surface lubricating fluid to wet the outside surfaces of the seal and rod.

It is also an object of this invention to improve damper efficiency by eliminating the constraint of dynamic damper seals which dictates that a specific leakage rate be provided for the purpose of lubrication to reduce seal wear. By providing a means of seal lubrication not coupled to the primary or resupply of fluid internal to the damper, the problems associated with leakage, detection of leakage, and resupply can be minimized, as well as reducing the adverse effects of external contamination.

BRIEF DESCRIPTION OF THE DRAWINGS

FIG. 2 is a cross sectional showing of a helicoptor rotor blade damper embodying this invention and shown in its extended position.

DESCRIPTION OF THE PREFERRED EMBODIMENT

Figure 1:
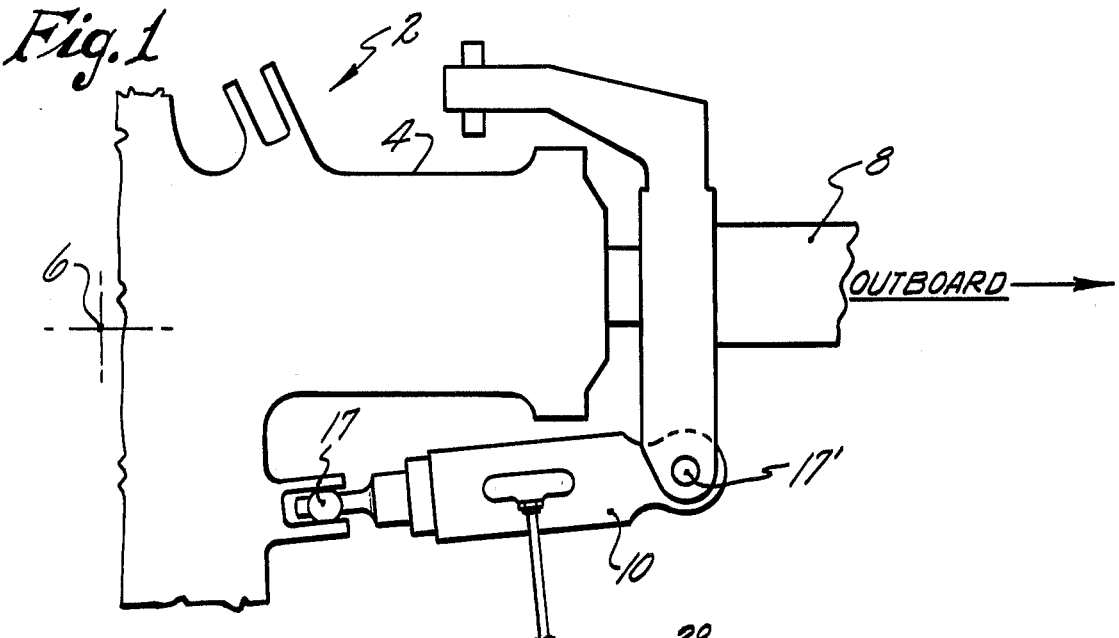
FIG. 1 is a showing of this lead-lag damper in the helicoptor rotor head environment.
Figure 3:
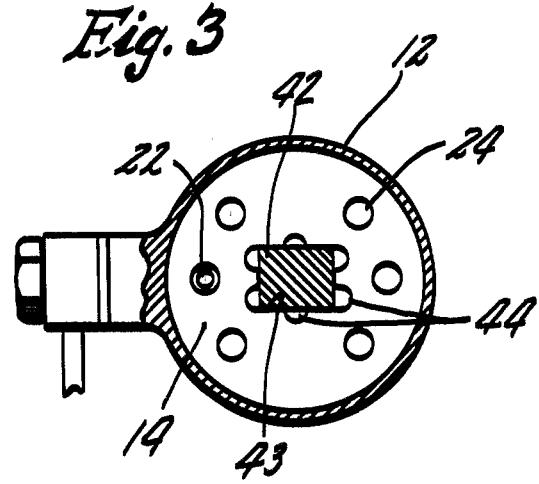
FIG. 3 is an end view of the damper piston head.

In an elastomeric bearing type helicoptor rotor hub, such as depicted in U.S. Pat. No. 3,782,854 to Rybicki, each rotor blade is mounted for pitch change, hunting, and flapping motions by means of one or more laminated metal-elastomer bearings. As shown in FIG. 1, helicopter rotor 2 consists of a hub 4 mounted for rotation about axis of rotation 6 and a plurality of helicopter blades 8 supported by and projecting therefrom for rotation therewith. A hydraulic fluid lead-lag damper is mounted in a horizontal plane between a connection point 17 on the rotor hub and a point 17' on the blade so as to provide damping primarily to the hunting, or lead-lag motions of the blade. U.S. patent application Ser. No. 584,237 filed on June 5, 1975 by G. Bochnak and assigned to the assignor of this application for improvements in damper leakage detection also depicts this type of rotor head mounted damper. Thus, FIG. 2 illustrates a damper 10 which is configured for use in the above described rotor head environment. It consists basically of the usual damper cylinder 12, piston head 14, and connecting rod 16. Both cylinder 12 and rod 16 are equipped with spherical bearings 17 for flexible mounting to the relatively moveable rotor hub 4 and blade 8. It is important that the connecting rod 16 be located radially inboard from the cylinder attachment point so that the centrifugal force of rotor head rotation may be utilized in the providing of lubrication according to the teachings of this invention. The piston head 14 may be integral or detachably fixed to the connecting rod 16, and includes a seal 18 and bearing 20 which are in contact with the inner diameter of the cylinder and provide sealing between the opposed chambers 19 and 21 of the damper. The piston head 14 also includes a damper orifice 22 and two or more one-way relief valves 24 arranged in a circular pattern as shown in FIG. 3. Closure and assembly of the damper is provided by means of a cylinder head 26 which is fixedly joined to the cylinder housing 12 and supports and guides the piston rod 16. Joining of the cylinder head 26 to the housing 12 is provided by conventional lock ring 28, and sealing is provided by static O-ring 30. Relative rotation between the cylinder housing 12 and the cylinder head 26 is prevented by means of tang washer 32, shown in FIG. 4, which is installed over a threaded portion 34 of the cylinder head and retained axially by slotted nut 36. Keys or tangs 33 of washer 32 slide into circumferentially spared, axial slots 35 of cylinder head 26 to prevent relative rotation between the cylinder head and washer. When several of its outer tabs 37 are bent in opposite directions into slots 39 in the nut 36 and slots or flats 38 in the cylinder housing 12, a fluid tight integral non-rotating closure is formed. Other means or configurations may be utilized to provide this closure.

For further understanding of the prime function and operation of the damper and its slide valve, reference is made to the assignee's aforementioned pending patent applications, or U.S. Pat. No. 3,212,584 to Young.

Figure 4:
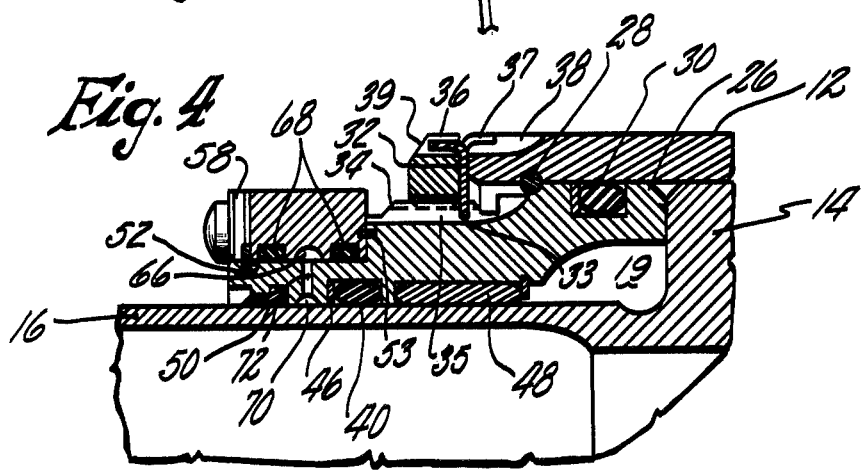
FIG. 4 is an enlarged view of the external seal and reservoir as depicted in FIG. 2.

FIG. 4 also depicts clearly the dynamic seal 40 to which this invention is addressed. Seal 40 may be made of rubber or other elastomer. Study has shown that the short, rapid, and numerous cyclic motions between the cylinder head 26 and piston rod 16 provide a challange to damper designers and seal manufactures, because of the susceptibility of the seal to wear rapidly under such adverse conditions. Such wear has generally resulted from the scuffing, dragging, stick-slip action of the seal when these small amplitude, reversing axial or rotational motions of the damper piston occur, and the seal is not fully lubricated from both sides. A snaking type action may also take place wherein the seal is elongated locally and may lose contact with the surfaces to be sealed. This will also produce leakage. Thus, the aspects of lubrication and motion are closely linked to both the problem and solution of seal failure and leakage. One known and currently used technique addressed to the concern of providing adequate lubrication and wear capability to these dynamic seals is to intentionally create a seal design by proper selection of seal and groove dimensions, material, surface finish, damper pressure, etc. such that a predetermined leakage rate is established past the seal so as to assure that the surfaces it contacts will be adequately wetted and therefore lubricated. This technique has been effective from the point of view of increased seal life, however, the continual flow of leaking fluid dissipates the supply and has led to the need to add a reservoir to resupply fluid to the internal damper system. This in turn has led to the requirement for an indicator for the reservoir to provide a visual warning when the auxiliary fluid supply has been exhausted. Possibly a more significant disadvantage of the intentional leakage system is that it is uncommon. That is, when the nature of the other systems is that visual signs of leaking fluid or drippings usually connotes the existence of a problem, maintenance personnel must be trained to realize that their thinking and prior training must be reversed in certain instances to understand that lack of spatters is a sign of trouble. This invention is also addressed to the tendency of wetted seal surfaces to retain sand and dirt which becomes imbedded in the elastomer of the seal and scores the fine finish of the piston rod by its abrasive action.

The combined features of this invention are directed to the limiting of undesired rotational motions imposed on the seal which would cause it to stretch and bunch in a snaking action when traveling on a non-wetted surface, together with the providing of a lubricating and environmental protective system divorced from the primary damper fluid or a reservoir supply fluid internally to the damper. With the cylinder housing 12 and cylinder head 26 rendered fixed to each other by means of the aforementioned lock ring 28, tang washer 32, and nut 36, there remains the requirement to prevent rotational freedom between the piston rod 16 and the cylinder head 26, without compromising the axial freedom of motion between these members when the damper is required to extend and contract in response to in-plane excursions of the connected helicoptor rotor blade. Anti-rotation shaft 42 of rectangular cross-section is cantilevered from the internal closed end 23 of cylinder housing 12 and extends through a mating rectangular opening 43 in the center of piston head 14 and into the hollow interior of rod 16.

Passageways 44 (see FIG. 3) are provided in piston head 14 to allow flow of fluid displaced from the interior of the rod 16 upon contraction of the damper whereby the shaft 42 extends into the rod. These passageways and the clearance between the shaft 42 and piston head 14 are made large enough so as not to compromise the desired damping rate of the device. They may also be sized in conjunction with the damper orifice 22 to achieve the damping rate desired. Contact between the flat sided surfaces of the shaft 42 and the piston head will thus serve to preclude rotary motion between the cylinder head 12 and piston rod 16.

Figure 5:
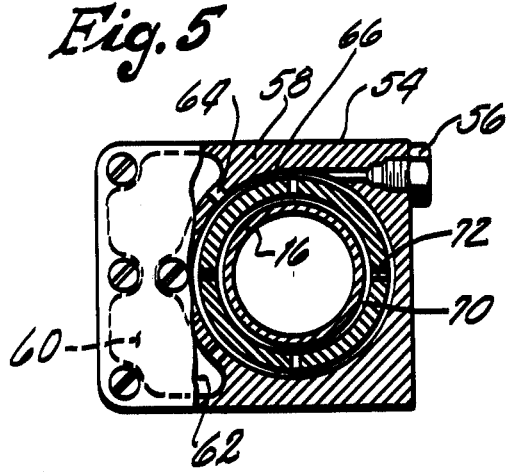
FIG. 5 is an end view of the inboard end of the damper assembly showing the full inner face of the reservoir.

As shown in FIG. 4, the dynamic seal 40, may be of the conventional single O-ring type, or may be used in combination with a retainer or packing ring 46 as depicted. In the damper shown, a cylindrical guide bearing 48 is utilized to support and guide piston rod 16. By the installation depicted in FIGS. 2 and 4, the right hand portion of the seal 40 will be exposed to the high pressure side of the damper action, and be in contact with its fluid, while the left hand portion is on the low pressure or potentially dry side. As is customary with dampers, a conventional scraper or wiper 50 is utilized to remove major contamination items in the form of chips, or grit, or other foriegn matter that may have come to rest on the wetted surface of the piston rod over which the seal must travel. Attached concentrically to the inboard end of the cylinder head 26, and restrained axially by a snap ring 52, and rotationally by dowel pin 53, is independent fluid reservoir 54, which is shown more fully in FIG. 5. Fluid is filled through capped inlet 56 on the top of the reservoir. It is contained in the lower compartment 60 of the reservoir and its level 62 can be determined by visual inspection, through transparent end cover 58, and replenished if required. The lower reservoir compartment 60 communicates by apertures 64 with annulus 66, which in turn communicates with inlet 56. Static O-ring seals 68 located on opposite sides of the annulus confine the fluid to the annulus 66. A second annulus 70 in cylinder head 26 is located radially inward from annulus 66, and communicates thereto by means of a series of apertures 72. Annulus 70, shown in particular in FIG. 4, is located just inboard of the dynamic seal 40, and outboard of wiper 50.

OPERATION OF THE INVENTION

As described heretofore, the damper as depicted in FIG. 2 is installed between fixed supports on the helicopter rotor hub and attachment points 17-17' on each rotor blade 8, wherein it is aligned substantially parallel to the extended blade. Depending upon the anti-friction characteristics of the spherical bearings at the opposite ends of the damper and the stop limits of those bearings, blade feathering motions will tend to rotate the damper housing. Also, due to the dissymmetry of the damper from its shuttle valve and external fluid lines, the centrifugal force created by the rotation of the rotor head will also rotate the damper. Due to the bearing of the anti-rotation or anti-torque shaft 42 against the mating surfaces 43 of the piston head 14, relative rotation between the damper cylinder housing 12 and piston rod 16 is prevented, and the rotation of the complete damper will take place at either or both of the spherical bearing joints at its opposite ends. Thus, no peripheral motion will be imparted to the dynamic seal 40 from either its inner or outer radial contact surface such as might cause a bulging and stretching of the seal. As the various components of the rotor head sustain the effects of the centrifugal force created by its rotation, the seal lubricating fluid in the compartment 60 of the reservoir 54 likewise reacts to this force, which drives it upward and outward to distribute the fluid in a vertical parabolic curve. This outward path leads the fluid through apertures 64, into the annulus 66, through apertures 72, into second annulus 70, onto the surface of the piston rod 16, and into contact with the low pressure side of dynamic seal 40. As the damper extends and contracts axially in response to the hunting motions of the blade, and the seal 40 is passed over the surface of the rod 16, the contact surface of the rod will be lubricant wetted internally by the fluid internal to the damper, and externally from the supplementary reservoir 54.

When the rotor head comes to rest, and the effect of centrifugal force on the supplemental fluid reduces to zero, the fluid within the apertures 72 and the first 66 and second 70 annulus will follow the path of least resistance under the force of gravity, and will drain back to chamber 60, which is the lowest point of the damper assembly. The wiper 50 will assist in this drainage and act as a low pressure dam or seal, directing fluid return back into the reservoir. This supply and return of fluid provides a washing or cleansing action on the seal and its contact surfaces which provides the benefit of loosening sand or grime therefrom and carrying it back to the lower chamber 60 of the reservoir. The contaminating sand will tend to accumulate there as in a sump. Because of its mounting arrangement, the reservoir can be easily and periodically replaced.

While this invention has particular suitability for use with rotor head blade dampers, and is described in detail therefor, variation in use and construction will occur to those skilled in this art which fall within the scope of the appended claims.

We claim:

1. A helicopter rotor having:
    A. a rotatable hub,
    B. at least one blade supported by said hub for rotation therewith,
    C. a hydraulic damper for damping relative motion between said hub and blade comprising:
        1. a cylinder connected to said blade, and
        2. a piston cooperating with said cylinder for reciprocation therewithin comprising:
            (a) a piston head within said cylinder to define hydraulic chambers on opposite sides thereof, and
            (b) a piston rod connected to said piston head and to said hub,
        3. sealing means comprising:
            (a) a seal ring enveloping said piston rod, and
            (b) means to support said seal ring from said cylinder, and
    D. fluid reservoir means enveloping said piston rod adjacent said seal ring and including:
        1. a fluid reservoir, and
        2. an annulus adjacent said seal ring located on the remote side of said seal ring from said piston head, and
        3. means connecting said reservoir to said annulus to direct fluid from said reservoir to said seal ring in response to centrifugal force.

2. The helicopter rotor of claim 1 and including means to prevent said piston rod from rotating relative to said cylinder seal ring support means.

3. A helicopter rotor including:
    A. a rotatable hub,
    B. at least one blade mounted from said hub for rotation therewith,
    C. a hydraulic damper extending between and connected to said hub and blade and having:
        1. a cylinder,
        2. a piston cooperating with said cylinder to define a piston cylinder assembly including a piston head located in the cylinder to form fluid chambers therewith on opposite sides of the piston,
        3. a piston rod connected to and projecting from said piston head toward said hub,
        4. a dynamic fluid retaining seal, enveloping said piston rod in sealing engagement therewith,
    D. seal antiscuffing means comprising:
        1. a rectangular shaped shaft internally mounted to the cylinder and in sliding engagement with at least one cooperating flat surface or the piston,
        2. fluid reservoir means mounted to the damper and including:
            (a) reservoir defining means located on the hub side of said dymanic seal,
            (b) an annular fluid chamber in the damper cylinder enveloping said piston rod located adjacent said dynamic seal, on the remote side of said seal from said piston head, and
            (c) a fluid passage connecting said reservoir to said annular chamber.

4. A helicopter rotor of claim 3 wherein the reservoir defining means is mounted concentrically to the damper cylinder and is shaped to define a fluid sump chamber located below the dynamic seal.

5. A helicopter rotor including a hydraulic blade motion fluid damper having a cylinder, a piston enveloped within the cylinder to define fluid chambers therewith on opposite sides of said piston, a piston rod extending from the piston, closure means for said cylinder, a dynamic fluid seal located between said cylinder closure means and said piston rod, said seal having a low pressure side and a high pressure side wherein said high pressure side is adjacent to and is lubricated by the internal damper fluid from said cylinder, lubrication means for the low pressure side of said seal including a fluid reservoir mounted to the damper, and having a fluid chamber located inboard and below the position of said seal, and a passageway in communication with the low pressure side of said seal so that fluid reservoir to the low pressure side of said seal in response to centrifugal force generated by the rotation of the rotor.

6. The helicopter rotor of claim 5 wherein the damper cylinder is connected to the rotor blade, and the piston rod is connected to the rotor hub, and including means to prevent said piston rod from rotation relative to said cylinder.

7. A helicopter rotor including a fluid damper for reaction of blade motions having a cylinder, a piston defining fluid chambers, a piston rod extending through one end of said cylinder, a closure for said cylinder, a dynamic fluid seal supported by said closure in contact with said piston rod, said seal having a first side in fluid contact with one of said fluid chambers, lubrication means for the seal second side including a fluid reservoir, and an annulus adjacent the second side of said seal in communication with the reservoir.

* * * * *

UNITED STATES PATENT OFFICE
CERTIFICATE OF CORRECTION

PATENT NO. : 4,105,365
DATED : August 8, 1978
INVENTOR(S) : Donald L. Ferris et al It is certified that error appears in the above-identified patent and that said Letters Patent are hereby corrected as shown below:

Claim 5

Column 7, Line 19   After "fluid" insert --will be fed from said fluid--

Signed and Sealed this

Fifth Day of June 1979

[SEAL]

Attest:

RUTH C. MASON
Attesting Officer

DONALD W. BANNER
Commissioner of Patents and Trademarks